(12) United States Patent
Marsilia et al.

(10) Patent No.: US 9,199,552 B2
(45) Date of Patent: Dec. 1, 2015

(54) SYSTEM AND METHOD FOR MONITORING THE TORQUE OF A MOTOR VEHICLE ENGINE

(71) Applicant: RENAULT S.A.S., Boulogne-Billancourt (FR)

(72) Inventors: Marco Marsilia, Boulogne-Billancourt (FR); Islam Ait-Hammouda, Antony (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/404,554

(22) PCT Filed: May 16, 2013

(86) PCT No.: PCT/FR2013/051067
§ 371 (c)(1),
(2) Date: Nov. 28, 2014

(87) PCT Pub. No.: WO2013/178907
PCT Pub. Date: Dec. 5, 2013

(65) Prior Publication Data
US 2015/0120116 A1    Apr. 30, 2015

Related U.S. Application Data

(60) Provisional application No. 61/654,360, filed on Jun. 1, 2012.

(30) Foreign Application Priority Data

May 30, 2012    (FR) ...................................... 12 54994

(51) Int. Cl.
*B60L 15/20* (2006.01)
*H02P 29/02* (2006.01)
*H02P 29/00* (2006.01)
*B60L 3/00* (2006.01)
*B60L 3/06* (2006.01)

(52) U.S. Cl.
CPC . *B60L 15/20* (2013.01); *B60L 3/00* (2013.01); *B60L 3/06* (2013.01); *B60L 15/2009* (2013.01); *H02P 29/0005* (2013.01); *H02P 29/02* (2013.01); *B60L 2240/423* (2013.01); *B60L 2240/463* (2013.01); *H02P 2205/05* (2013.01); *Y02T 10/642* (2013.01); *Y02T 10/7275* (2013.01)

(58) Field of Classification Search
USPC .......................................................... 701/22
See application file for complete search history.

(56) References Cited

U.S. PATENT DOCUMENTS 4,379,332 A * 4/1983 Busser et al. ................. 701/105
5,543,695 A   8/1996 Culp et al.

(Continued)

FOREIGN PATENT DOCUMENTS

WO    2007/125743 A1    11/2007

OTHER PUBLICATIONS

International Search Report issued May 19, 2014 in PCT/FR2013/051067 filed May 16, 2013.
French Preliminary Search Report issued Mar. 20, 2013 in French Patent Application No. 1254994 filed May 30, 2012.

*Primary Examiner* — Thomas Tarcza
*Assistant Examiner* — Alex C Dunn
(74) *Attorney, Agent, or Firm* — Oblon, McClelland, Maier & Neustadt, L.L.P.

(57) ABSTRACT

A method for monitoring torque produced by a motor vehicle engine, or an electric engine, including: comparing an estimated or measured value of torque produced by the engine with a low limit value or high limit value to detect excessive braking or acceleration and/or a lack of braking or acceleration; calculating the low limit value or high limit value, the calculating including: subtracting or adding a static error value to a torque value requested by a driver of the vehicle to obtain a low or high intermediate signal; and applying, to the intermediate signal, a delay corresponding to a response time of the engine to a torque increase request or to a torque decrease request expressed by the driver of the vehicle.

10 Claims, 4 Drawing Sheets

(56) References Cited

U.S. PATENT DOCUMENTS

Figure 1:
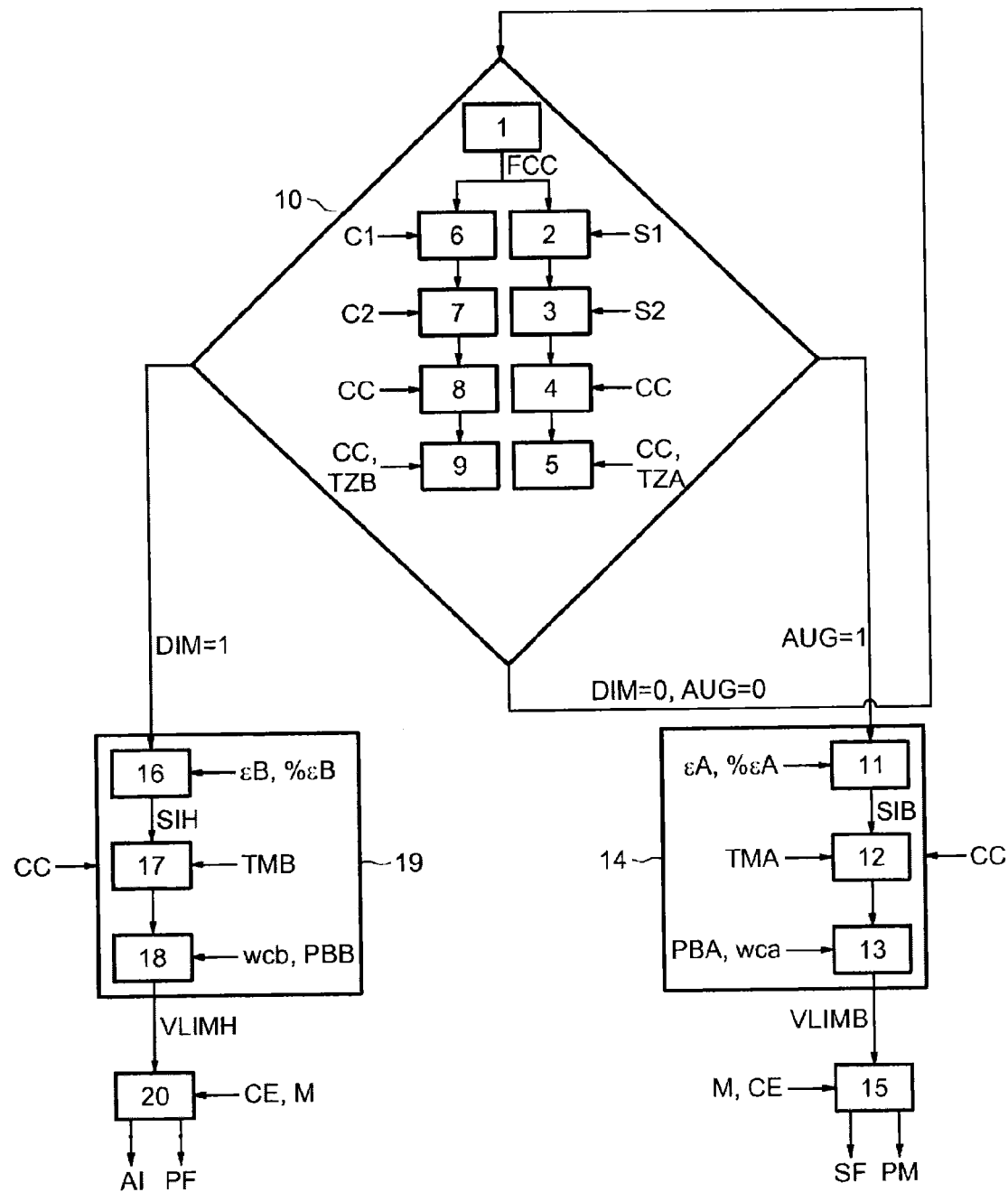

| | | | |
|---|---|---|---|
| 5,689,159 A | 11/1997 | Culp | |
| 6,076,500 A | 6/2000 | Clement et al. | |
| 6,236,931 B1 * | 5/2001 | Poggio et al. | 701/104 |
| 6,772,059 B2 * | 8/2004 | Hellmann et al. | 701/96 |
| 6,879,903 B2 * | 4/2005 | Jaliwala et al. | 701/104 |
| 7,266,463 B2 * | 9/2007 | Dixon et al. | 702/64 |
| 8,400,287 B2 * | 3/2013 | Visconti et al. | 340/438 |
| 2005/0050965 A1 | 3/2005 | Zaremba et al. | |
| 2008/0315814 A1 | 12/2008 | Takizawa et al. | |
| 2012/0109431 A1 | 5/2012 | Wang et al. | |
| 2015/0081183 A1 * | 3/2015 | Schueler et al. | 701/53 |

* cited by examiner

SYSTEM AND METHOD FOR MONITORING THE TORQUE OF A MOTOR VEHICLE ENGINE

The technical field of the invention is that of monitoring systems, and more particularly that of systems for monitoring the torque of an engine fitted to a vehicle, for example an electrically powered vehicle.

By monitoring the torque exerted by the engine of a vehicle, it is possible, notably, to detect a lack of consistency corresponding to a failure to match the torque requested by the driver with the torque exerted by the engine.

Patent application US 2009/066281 discloses a strategy for monitoring the torque of the engine of an electric (or hybrid) vehicle, based on a comparison between a torque setpoint and an estimate of the torque provided by the electric engine. At low speed, this estimate is made on the basis of the rotor position and a phase current of the engine. At high speed, the estimate is calculated on the basis of the power supplied by the traction battery.

Patent application US 2005/050965 discloses a strategy for monitoring the torque of the engine of an electric vehicle based on a comparison between a torque setpoint, a first estimate of the torque exerted by the engine, based on the measurement of the engine currents, and a second estimate of the torque provided, based on the engine speed, the power supplied by the traction battery, the losses (mechanical and electrical) and the power consumed by consuming elements other than the engine.

Finally, patent application US 2010/042276 discloses a strategy for monitoring the torque of the engine of a hybrid vehicle. According to this strategy, a check is made at each instant as to whether the sum of the torques of the vehicle engines (electric and combustion) lies within a range calculated on the basis of a torque setpoint and the maximum and minimum torques that can be exerted by the electric and combustion engines.

As a general rule, the prior art strategies for torque monitoring are based on a comparison with a threshold of tolerance of the difference between a torque setpoint and one or more estimated torques.

Consequently, these strategies are appropriate only for slow variations in the torque setpoint. This is because, during phases of rapid variation, the slightest phase displacement between the torque request and the torque estimate, due for example to a normal delay between the torque request and the provision of the torque by the engine, results in a large difference in torque. This difference may exceed the tolerance threshold in nominal operation.

Therefore, it would appear that these monitoring strategies, when used in phases of rapid variation of the torque setpoint, give rise to inappropriate detection of the crossing of the threshold, even if there is not necessarily any deficiency in the torque provided by the engine.

One object of the invention is therefore to propose a method for monitoring the engine torque that can operate, notably, during phases of rapid variation of a torque setpoint.

According to one embodiment and application of the invention, a method for monitoring the engine torque that is simple and easy to execute is proposed.

According to one embodiment and application of the invention, detection of problems in the acceleration and/or braking of the vehicle is also proposed.

The invention proposes a method for monitoring the torque provided by a motor vehicle engine, notably an electric engine, comprising:

a step of comparing an estimated or measured value of torque provided by said engine with a low or high limit value, in order to detect excessive braking or acceleration and/or insufficient braking or acceleration.

According to a general characteristic, the method further comprises a step of calculating said low or high limit value, said calculation step comprising:

subtracting, or adding, a static error value from or to a torque value requested by the vehicle driver, in order to obtain a low or high intermediate signal; and applying to said intermediate signal a delay corresponding to a delay in the response of the engine to a request for increased torque or a request for reduced torque expressed by the vehicle driver.

Thus, comparison of the estimated torque with a low limit or a high limit is provided for. If these limits are crossed, this will trigger the detection of excessive braking or acceleration and/or insufficient braking or acceleration.

Compared with the prior art, which simply uses a low or high limit based on a fixed threshold, the invention adds the application of a delay to the calculation of the low or high limit. This delay corresponds to a maximum acceptable delay in the response of the engine in the case of an increase or reduction in the torque request.

In this way, limit values are obtained and are such that a normal delay of the engine in response to an increase or reduction does not cause the limit to be crossed.

According to one characteristic, the method further comprises a step of recognition of an increase or reduction in the torque request, in which:

said estimated or measured value of torque provided by the engine is compared with the low limit value if an increase in the torque request is recognized, in order to detect excessive braking and/or insufficient acceleration; and said estimated or measured value of torque provided by the engine is compared with the high limit value if a reduction in the torque request is recognized, in order to detect excessive acceleration and/or insufficient braking.

The monitoring method is simple. The two limits, low and high, are not tested systematically. On the contrary, the high limit or the low limit is tested when there is a greater probability that it has been crossed.

According to another characteristic, the calculation step for obtaining a low or high limit value comprises a step of filtering the delayed intermediate signal by means of a low-pass filter having a cut-off pulsation representing the dynamics of the response of the engine to a request for increased or reduced torque.

If the low-pass filtering corresponds to acceptable engine dynamics, the crossing of the limits due to the engine dynamics is avoided if the dynamics remain within an acceptable range.

According to one embodiment, the calculation step for obtaining the low limit value comprises:

subtracting a first static error from the torque value requested by the vehicle driver, in order to obtain a low intermediate signal; and applying to said low intermediate signal a delay corresponding to a maximum delay in the response of the engine to a request for increased torque expressed by the vehicle driver.

According to another embodiment, the calculation step for obtaining the high limit value comprises:

adding a second static error to the torque value requested by the vehicle driver, in order to obtain a high intermediate signal; and applying to said high intermediate signal a delay corresponding to a maximum delay in the response of the engine to a request for reduced torque expressed by the vehicle driver.

The calculations of the high or low limit values are similar and very simple.

According to a supplementary embodiment, the recognition step comprises:
a step of high-pass filtering of the torque request; and
a comparison step, comprising:
 comparing the high-pass filtered torque request with a first positive threshold in order to recognize the start of a phase of increase of the torque request expressed by the vehicle driver; and
 comparing the high-pass filtered torque request with a second positive threshold in order to recognize the end of a phase of increase of the torque request, said second positive threshold being lower than said first positive threshold; or
 comparing the high-pass filtered torque request with a first negative threshold in order to recognize the start of a phase of reduction of the torque request expressed by the vehicle driver; and
 comparing the high-pass filtered torque request with a second negative threshold in order to recognize the end of a phase of reduction of the torque request, said second negative threshold being higher than said first negative threshold.

The detection of a phase of increase or reduction is both simple and rapid, owing to the provision of high-pass filtering. With the aid of these steps for recognizing the start and end of the phases of increase and reduction, it is possible to determine windows during which the torque increases or is reduced, respectively. It is then possible to monitor the engine torque solely during these phases of increase and reduction.

The invention also proposes a system for monitoring the torque provided by a motor vehicle engine, notably an electric engine, comprising:
 means for comparing an estimated or measured value of torque provided by said engine with a low or high limit value, in order to detect excessive braking or acceleration and/or insufficient braking or acceleration.

According to a general characteristic, the system further comprises a means for calculating said low or high limit value, said calculation means comprising:
 a means for subtracting, or adding, a static error value from or to a torque value requested by the vehicle driver, in order to obtain a low or high intermediate signal; and
 a means for applying to said intermediate signal a delay corresponding to a delay in the response of the engine to a request for increased or reduced torque expressed by the vehicle driver.

According to one characteristic, the system further comprises means for recognizing an increase or a reduction in the torque request expressed by the vehicle driver, said comparison means comprising:
 means configured to compare said torque value with the low limit value if an increase in the torque request is recognized, in order to detect excessive braking and/or insufficient acceleration; and
 means to compare said torque value with said high limit value if a reduction in the torque request is recognized, in order to detect excessive acceleration and/or insufficient braking.

According to another characteristic, the means for calculating said low or high limit value comprises a means for low-pass filtering of the delayed intermediate signal, having a cut-off pulsation representing the dynamics of the response of the engine to a request for increased torque or for reduced torque expressed by the vehicle driver.

According to one embodiment, the calculation means for obtaining the low limit value comprises:
 a means for subtracting a first static error from the torque request, in order to obtain a low intermediate signal; and
 a means for applying to said low intermediate signal a delay corresponding to the maximum delay in the response of the engine to a request for increased torque;
and the calculation means for obtaining the high limit value comprises:
 a means for adding a second static error to the torque request, in order to obtain a high intermediate signal; and
 a means for applying to said high intermediate signal a delay corresponding to the maximum delay in the response of the engine to a request for reduced torque.

Other objects, characteristics and advantages will be apparent from the following description, provided solely by way of non-limiting example with reference to the attached drawings, in which:

FIG. 1 shows an embodiment of a torque monitoring method according to the invention; and FIGS. 2 to 5 show schematic diagrams of a torque monitoring system according to one embodiment of the invention.

The torque monitoring method of FIG. 1 is a monitoring method which monitors an engine M, for example the electric engine of a motor vehicle, in order to detect anomalies in the torque provided by this engine M.

The torque provided is the result of a torque request CC transmitted to the engine M. The engine M must then provide a torque in accordance with this torque request CC. The torque request CC may, for example, be expressed by the driver of the vehicle, or may also be expressed by a computer receiving running conditions of the vehicle and a speed setpoint from the driver.

Step 10 of the monitoring method consists in detecting whether the torque request CC is in a phase of increase or whether the torque request CC is in a phase of reduction.

In other words, step 10 of the method is a step of recognizing a phase of increase or reduction of the torque setpoint CC.

Step 10 of the monitoring method comprises a substep 1 of high-pass filtering of the torque request CC in order to obtain the high-pass filtered torque request FCC. This step is executed, for example, by a high-pass filter whose transfer function is:

$$\frac{s}{1 + \frac{s}{wc}}$$

where wc is the cut-off pulsation of the high-pass filter in rad·s$^{-1}$, and s is the Laplace variable.

Step 10 comprises, on the one hand, two substeps 2, 3 for detecting a phase of increase of the requested torque CC, as follows:
 a step 2 of comparing the high-pass filtered torque request FCC with a first positive threshold S1 in order to recognize the start of a phase of increase of the torque request CC. Thus, in step 2, the start of a phase of increase is recognized if the filtered torque setpoint FCC is greater than the threshold S1; and
 a step 3 of comparing the high-pass filtered torque request FCC with a second positive threshold S2 in order to recognize the end of a phase of increase of the torque request. Thus, in step 3, the end of a phase of increase is recognized if the filtered torque setpoint FCC is lower than the threshold S2.

The positive threshold S2 is lower than the first positive threshold S1, and the thresholds S1 and S2 are sufficiently far apart. Thus inopportune recognitions and cessations of recognition are avoided. Several threshold values are possible, for example in the range from 0 to 100 Nm·s$^{-1}$, for example S1=20 Nm·s$^{-1}$ and S2=15 Nm·s$^{-1}$.

According to one embodiment, step 10 comprises, in addition to substeps 2 and 3, two other supplementary substeps:
- a first supplementary substep 4 which is a step for recognizing the end of a phase of increase of the torque request. It comprises the comparison of the derivative of the requested torque CC with the zero value. According to this first substep, the end of a phase of increase is recognized if the derivative of the requested torque CC is negative;
- a second supplementary substep 5 which is a step for recognizing the end of a phase of increase of the torque request. It comprises the measurement of the period during which the torque request CC ceases to increase. That is to say, the period during which the derivative of the requested torque CC takes a negative or zero value. According to this second substep, the end of a phase of increase is recognized if the derivative of the requested torque CC takes a negative or zero value during at least a period TZA, equal to 0.05 second for example, which is an adjustment parameter of the monitoring method.

Step 10 comprises, on the other hand, two substeps 6, 7 for detecting a phase of reduction of the requested torque CC:
- the step 6 of comparing the high-pass filtered torque request FCC with a first negative threshold C1 in order to recognize the start of a phase of reduction of the torque request. Thus, in step 6, the start of a phase of reduction is recognized if the filtered setpoint is lower than the threshold C1; and
- a step 7 of comparing the high-pass filtered torque request FCC with a second negative threshold C2 in order to recognize the end of a phase of reduction of the torque request. Thus, in step 7, the end of a phase of reduction is recognized if the filtered setpoint FCC is higher than the threshold C2.

The second negative threshold C2 is higher than the first negative threshold C1, and the thresholds C1 and C2 are sufficiently far apart. Thus inopportune recognitions and cessations of recognition are avoided. Several threshold values are possible, for example in the range from 0 to −100 Nm·s$^{-1}$, for example C2=−45Nm·s$^{-1}$ and C1=−55Nm·s$^{-1}$.

According to one embodiment, step 10 comprises, in addition to substeps 6 and 7, two supplementary substeps 8 and 9, as follows:
- step 8 is a step for recognizing the end of a phase of reduction of the torque request. It comprises the comparison of the derivative of the requested torque CC with the zero value. According to step 8, the end of a phase of reduction is recognized if the derivative of the requested torque CC is positive;
- step 9 is a step for recognizing the end of a phase of reduction of the torque request. It comprises the measurement of the period during which the torque request CC ceases to be reduced. That is to say, the period during which the derivative of the requested torque CC takes a positive or zero value. In step 9, the end of a phase of reduction is recognized if the derivative of the requested torque CC takes a positive or zero value during at least a period TZB, equal to 0.05 second for example, which is an adjustment parameter of the monitoring method.

Thus, at the end of the recognition step 10, a Boolean variable AUG indicates the detection of a phase of increase, and a Boolean variable DIM indicates the detection of a phase of reduction. The method then continues along three branches.

In a first branch (at the bottom), neither a phase of increase nor a phase of reduction is detected. That is to say, DIM=0 and AUG=0, and the monitoring method then continues with a new acquisition of the requested torque CC and a new recognition step 10.

In a second branch (on the right), a phase of increase is detected. That is to say, AUG=1, and the monitoring method continues with steps 14 and 15.

In a third branch (on the left), a phase of reduction is detected. That is to say, DIM=1, and the monitoring method continues with steps 19 and 20.

In the second branch (on the right), step 14 of the monitoring method is a calculation step for obtaining a low limit value VLIMB, this limit value being used for a comparison in step 15.

Step 14 comprises calculation steps 11, 12 and 13.

Step 11 is a subtraction step, in which the value of a first static error ϵA is subtracted from the torque request CC, in order to obtain a low intermediate signal SIB.

This static error can be expressed in the form of a static error as an absolute value, a static error as a percentage of the torque request or as both of these. As a general rule, the formula to be used to obtain the signal SIB is:

$$SIB = CC - \max\left(\epsilon A, |CC| \cdot \frac{\% \, \epsilon A}{100}\right),$$

where ϵA is the static error and %ϵA is the static error expressed as a percentage of the setpoint CC.

For example, the following values are used: ϵA=5 Nm and %ϵA=6. These values are determined during a characterization of the engine M, during which the maximum acceptable values of static error ϵA and %ϵA are determined for normal operation of the engine during a phase of increase of the requested torque CC.

Step 12 is a step of applying a delay with a period of TMA to the low intermediate signal SIB. The period TMA is an adjustment parameter of the monitoring method; for example, TMA=0.1 second. This value is determined during a characterization of the engine M during which the maximum acceptable period of the response of the engine to an increase in the torque setpoint is determined, taking into account the estimation or measurement period.

Step 13 is a step of low-pass filtering of the low signal SIB after it has been delayed by the period TMA. For this purpose, a pass filter PBA, having a cut-off pulsation wca, is used. In an exemplary embodiment, the Laplace transform transfer function of the filter PBA is:

$$\frac{1}{1 + \frac{s}{wca}}$$

The pulsation wca is an adjustment parameter of the monitoring method; for example, wca=5 rad·s$^{-1}$. This value is determined during a characterization of the engine M during which the minimum acceptable dynamics of the response of the engine to an increase in the torque setpoint are determined, taking into account the estimation or measurement period.

Thus, at the end of step 14, the low limit VLIMB is equal to the signal SIB determined in step 11 after a delay according to step 12 and low-pass filtering according to step 13 have been applied to this signal. According to another embodiment, the low limit value VLIMB is equal to the signal SIB determined in step 11 after a delay according to step 12 has been applied to this signal, the filtering step 13 being eliminated.

Step 15 of the method consists in comparing an estimated or measured provided torque CE with the value VLIMB and the zero value.

The estimated or measured provided torque CE may, according to one embodiment, be measured directly by a torque measurement sensor or may, in another embodiment, be calculated by a means of estimation (i.e. a computer) on the basis of other measurement parameters such as the currents consumed by the electric engine in different calculation methods well known to persons skilled in the art.

Step 15 comprises the reception of an estimated or measured torque value CE, provided by the engine M.

During step 15, the presence of the following four conditions is then monitored:
condition 1: recognition of an increase in the torque request AUG;
condition 2: the torque value CE is lower than the low value VLIMB;
condition 3: the torque value CE is greater than or equal to the zero value; and
condition 4: the torque value CE is lower than the zero value.

If, and only if, conditions 1 to 3 are present, insufficient acceleration is detected. This information is then indicated via a Boolean value PM which takes the value of 1.

If, and only if, conditions 1, 2 and 4 are present, excessive braking is detected. This information is then indicated via a Boolean value SF which takes the value of 1.

In the third branch (on the left), step 19 of the monitoring method is a calculation step for obtaining a high limit value VLIMH, this limit value being used for a comparison in step 20.

Step 19 comprises calculation steps 16, 17 and 18.

Step 16 is an addition step, in which the value of a first static error εB is added to the torque request CC, in order to obtain a high intermediate signal SIH.

This static error can be expressed in the form of a static error as an absolute value, a static error as a percentage of the torque request or as both of these. As a general rule, the formula to be used to obtain the signal SIH is:

$$SIH = CC + \max\left(\varepsilon B, |CC| \cdot \frac{\% \, \varepsilon B}{100}\right),$$

where εB is the static error and %εB is the static error expressed as a percentage of the setpoint CC.

For example, the following values are used: εB=5 Nm and %εB=6. These values are determined during a characterization of the engine M, during which the maximum acceptable values of static error εB and %εB are determined for normal operation of the engine during a phase of reduction of the requested torque CC.

Step 17 is a step of applying a delay with a period of TMB to the high intermediate signal SIH. The period TMB is an adjustment parameter of the monitoring method; for example, TMB=0.1 second. This value is determined during a characterization of the engine M during which the maximum acceptable period of the response of the engine to a reduction in the torque setpoint is determined, taking into account the estimation or measurement period.

Step 18 is a step of low-pass filtering of the high signal SIH after it has been delayed by the period TMB. For this purpose, a pass filter PBB, having a cut-off pulsation wcb, is used. In an exemplary embodiment, the Laplace transform transfer function of the filter PBB is:

$$\frac{1}{1 + \frac{s}{\text{wcb}}}$$

The pulsation wcb is an adjustment parameter of the monitoring method; for example, wcb=5 rad·s$^{-1}$. This value is determined during a characterization of the engine M during which the minimum acceptable dynamics of the response of the engine to a reduction in the torque setpoint are determined, taking into account the estimation or measurement period.

Thus, at the end of step 19, the high limit VLIMH is equal to the signal SIH determined in step 16 after a delay according to step 17 and low-pass filtering according to step 18 have been applied to this signal. According to another embodiment, the high limit value VLIMH is equal to the signal SIH determined in step 16 after a delay according to step 17 has been applied to this signal, the filtering step 18 being eliminated.

Step 20 of the monitoring method consists in comparing an estimated or measured provided torque CE with the value VLIMH and the zero value.

The estimated or measured provided torque CE may, according to one embodiment, be measured directly by a torque measurement sensor or may, in another embodiment, be calculated by a means of estimation (i.e. a computer) on the basis of other measurement parameters such as the currents consumed by the electric engine in different calculation methods well known to persons skilled in the art.

Step 20 comprises the reception of an estimated or measured torque value CE, provided by the engine M.

During step 20, the presence of the following four conditions is then monitored:
condition 1: recognition of a reduction in the torque request DIM;
condition 2: the torque value CE is greater than the high value VLIMH;
condition 3: the torque value CE is greater than or equal to the zero value; and
condition 4: the torque value CE is lower than the zero value.

If, and only if, conditions 1 to 3 are present, excessive acceleration is detected. This information is then indicated via a Boolean value AI which takes the value of 1.

If, and only if, conditions 1, 2 and 4 are present, insufficient braking is detected. This information is then indicated via a Boolean value PF which takes the value of 1.

Figure 2:
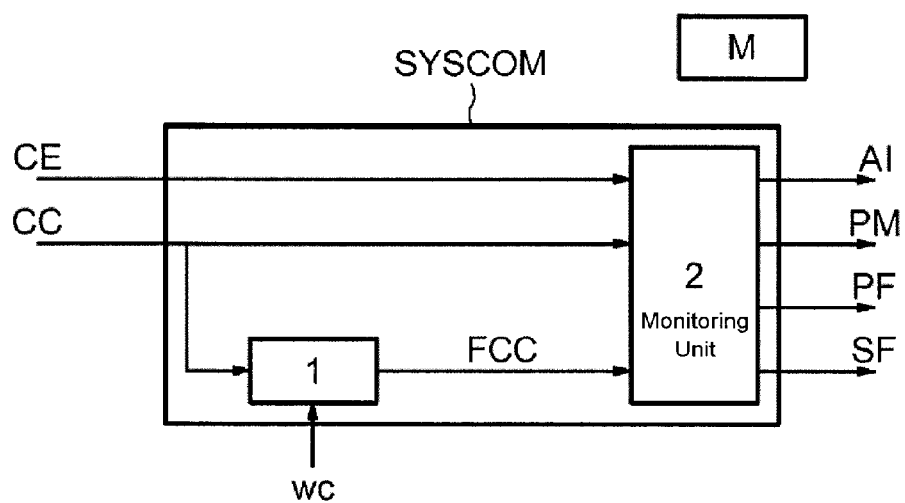

FIG. 2 shows an embodiment of a system SYSCOM for monitoring the torque provided by an engine M.

The system SYSCOM comprises a first high-pass filter unit 1 and a second torque monitoring unit 2. The system SYSCOM receives the estimated or measured torque CE and the torque request CC.

The unit 1 filters the torque request CC to obtain the signal FCC corresponding to the high-pass filtered torque setpoint. The unit 1 executes step 1 of FIG. 1. The unit 1 corresponds to a high-pass filter which has its cut-off pulsation wc as its parameter.

The monitoring unit 2 receives the estimated or measured torque CE, the torque request CC and the high-pass filtered setpoint FCC.

Figure 3:
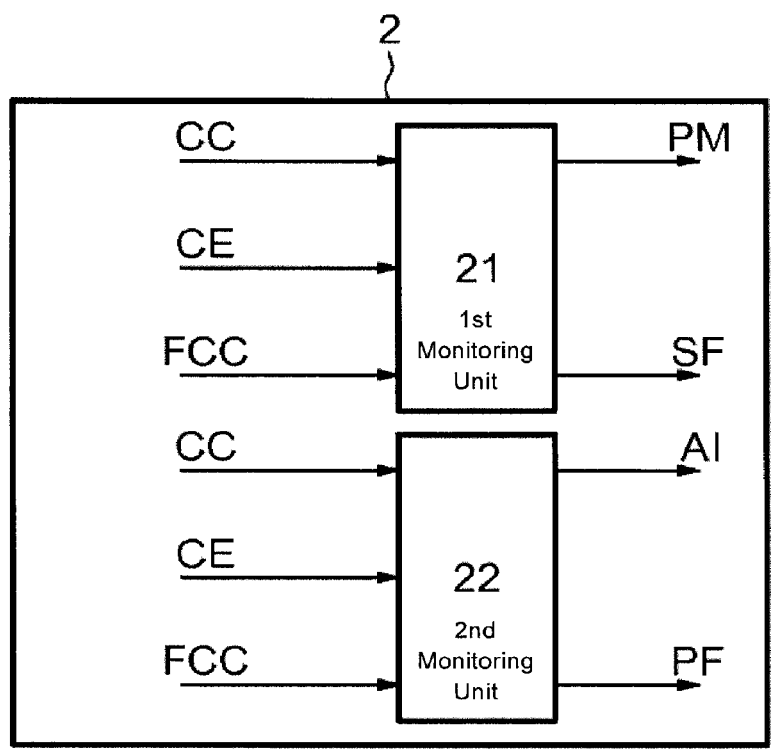

FIG. 3 shows an embodiment of the monitoring unit 2.

The monitoring unit 2 comprises a first monitoring unit 21 in the case of a reduction of the setpoint CC and a second monitoring unit 22 in the case of an increase in the setpoint CC.

The unit 21 receives the estimated or measured torque CE, the torque request CC and the high-pass filtered setpoint FCC, and deduces from these the two Boolean values PM and SF. The unit 21 executes steps 2, 3, 4, 5, 14 and 15 of the monitoring method of FIG. 1.

The unit 22 receives the estimated or measured torque CE, the torque request CC and the high-pass filtered setpoint FCC, and deduces from these the two Boolean values AI and PF. The unit 21 executes steps 6, 7, 8, 9, 19 and 20 of the monitoring method of FIG. 1.

Figure 4:
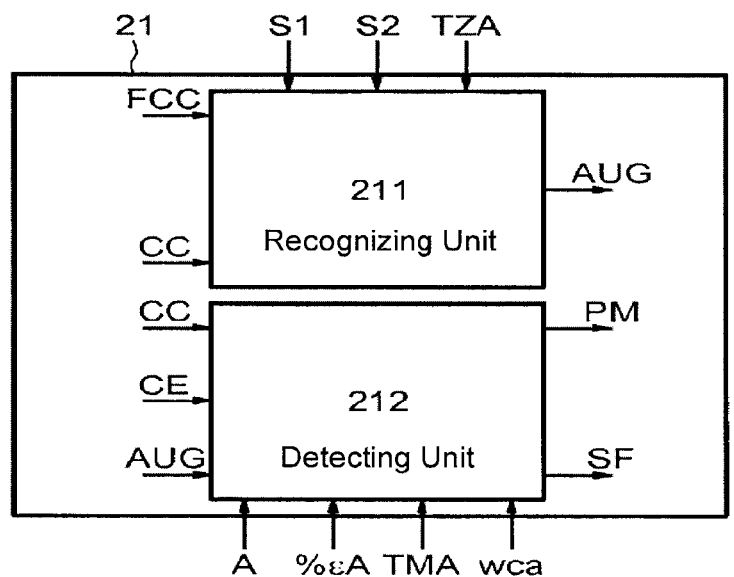

FIG. 4 shows an embodiment of the monitoring unit 21.

The monitoring unit 21 comprises a unit 211 for recognizing a phase of increase of the torque request and a unit 212 for detecting excessive braking and/or insufficient acceleration of the engine M.

The unit 211 recognizes a phase of increase in the torque request CC. It receives the torque request CC and the high-pass filtered setpoint FCC, and deduces from these the Boolean value AUG indicating the recognition of a phase of increase. For this purpose, the unit 211 also receives the parameters S1, S2, and TZA and executes steps 2 to 5 of FIG. 1.

The unit 211 therefore comprises means for comparing the high-pass filtered torque request FCC with the thresholds S1 and S1. The unit 211 also comprises means for calculating the derivative of the torque request CC, means for comparing the derivative of the torque request with the zero value, and means for measuring the period during which the derivative of the torque request takes the zero value.

On the basis of these operations, the unit 211 is configured to supply a Boolean value AUG which takes the value 1, indicating the recognition of a phase of increase in the torque request CC, or takes the value 0, indicating non-recognition of a phase of increase in the torque request CC.

The unit 212 receives the estimated or measured torque CE, the torque request CC and the Boolean value AUG. It deduces from these a Boolean value PM indicating the detection of insufficient acceleration and a Boolean value SF indicating the detection of excessive braking. It also receives the parameters $\epsilon$A, %$\epsilon$A, TMA and wca, and executes steps 14 and 15 of FIG. 1.

The unit 212 therefore comprises means for calculating a low limit value VLIMB and means for comparing the estimated or measured torque CE with the value VLIMB.

More precisely, the unit 212 comprises means for subtracting a static error $\epsilon$A and/or %$\epsilon$A in order to calculate an intermediate signal SIB, means for applying a delay TMA, and low-pass filtering means. The last of these is, for example, the low-pass filter PBA having a cut-off pulsation wca.

The unit 212 further comprises means for monitoring the following four conditions:
condition 1: recognition of an increase in the torque request AUG;
condition 2: the estimated or measured torque value CE is lower than the low value VLIMB;
condition 3: the estimated or measured torque value CE is greater than or equal to the zero value; and
condition 4: the estimated or measured torque value CE is lower than the zero value.

These monitoring means are exemplary embodiments of the means for the logical combinations of these four conditions, which can be expressed in the following mathematical format:
condition 1: AUG=1;
condition 2: CE<VLIMB;
condition 3: CE>0 or CE=0; and
condition 4: CE<0.

Figure 5:
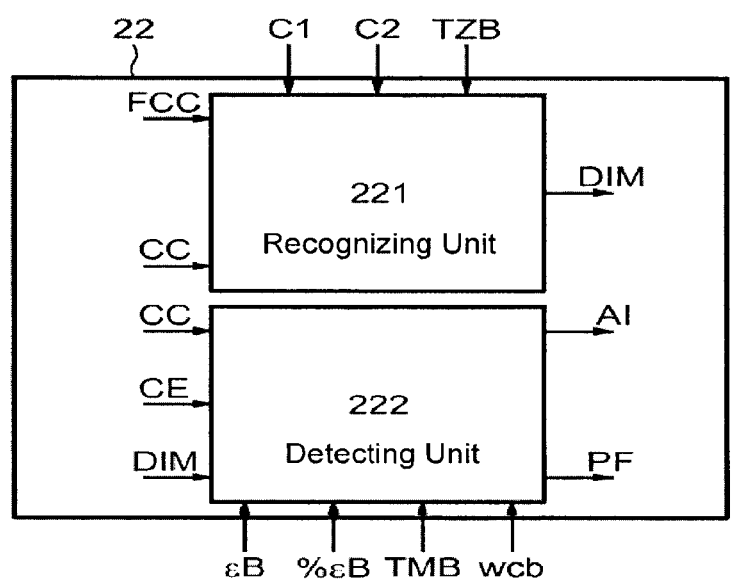

FIG. 5 shows an embodiment of the monitoring unit 22.

The monitoring unit 22 comprises a unit 221 for recognizing a phase of reduction of the torque request and a unit 222 for detecting excessive acceleration and/or insufficient braking of the engine M.

The unit 221 recognizes a phase of reduction of the torque request CC. It receives the torque request CC and the high-pass filtered setpoint FCC, and deduces from these the Boolean value DIM indicating the recognition of a phase of reduction. For this purpose, the unit 221 also receives the parameters C1, C2, and TZB, and executes steps 6 to 9 of FIG. 1.

The unit 221 therefore comprises means for comparing the high-pass filtered torque request FCC with the thresholds C1 and C2. The unit 221 also comprises means for calculating the derivative of the torque request CC, means for comparing the derivative of the torque request with the zero value, and means for measuring the period during which the derivative of the torque request takes the zero value.

On the basis of these operations, the unit 221 is configured to supply a Boolean value DIM which takes the value 1, indicating the recognition of a phase of reduction of the torque request CC, or takes the value 0, indicating non-recognition of a phase of reduction of the torque request CC.

The unit 222 receives the estimated or measured torque CE, the torque request CC and the Boolean value DIM. It deduces from these a Boolean value PF indicating the detection of insufficient braking and a Boolean value AI indicating the detection of excessive acceleration. It also receives the parameters $\epsilon$B, %$\epsilon$B, TMB and web, and executes steps 19 and 20 of FIG. 1.

The unit 222 therefore comprises means for calculating a low limit value VLIMH and means for comparing the estimated or measured torque CE with the value VLIMH.

More precisely, the unit 222 comprises means for adding a static error $\epsilon$3 and/or %$\epsilon$B in order to calculate an intermediate signal SIH, means for applying a delay TMB, and low-pass filtering means. The last of these is, for example, the low-pass filter PBB having a cut-off pulsation web.

The unit 222 further comprises means for monitoring the following four conditions:
condition 1: recognition of a reduction in the torque request DIM;
condition 2: the torque value CE is greater than the high value VLIMH;
condition 3: the torque value CE is greater than or equal to the zero value; and
condition 4: the torque value CE is lower than the zero value.

These monitoring means are exemplary embodiments of the means for the logical combinations of these four conditions, which can be expressed in the following mathematical format:

condition 1: DIM=1;
condition 2: CE>VLIMH;
condition 3: CE>0 or CE=0; and
condition 4: CE<0.

In an exemplary embodiment, the control system SYSCOM can be integrated into an electronic control unit of the engine M. The units 1, 2, 21, 22, 222, 221, 211, 212 of the control system SYSCOM can be provided, for example, in the form of software modules, or, in the case of some of these units, in the form of logic circuits. The setting of one of the Boolean values AI, PF, SF, PM to 1 may cause safety action to be taken on the engine M by a central computer or by the electronic control unit of the engine M.

The invention claimed is:

1. A method for monitoring torque provided by a motor vehicle engine, or an electric engine, comprising:
    comparing an estimated or measured value of torque provided by the engine with a low limit value or high limit value, to detect excessive braking or acceleration and/or insufficient braking or acceleration;
    calculating the low or high limit value, the calculation comprising:
        subtracting, or adding, a static error value from or to a torque value requested by the vehicle driver, to obtain a low or high intermediate signal; and
        applying to the intermediate signal a delay corresponding to a delay in a response of the engine to a request for increased torque or a request for reduced torque expressed by the vehicle driver.

2. The method as claimed in claim 1, further comprising recognition of an increase or reduction in the torque request, in which:
    the estimated or measured value of torque provided by the engine is compared with the low limit value if an increase in the torque request is recognized, to detect excessive braking and/or insufficient acceleration; and
    the estimated or measured value of torque provided by the engine is compared with the high limit value if a reduction in the torque request is recognized, to detect excessive acceleration and/or insufficient braking.

3. The method as claimed in claim 1, wherein the calculation for obtaining a low or high limit value further comprises filtering the delayed intermediate signal by a low-pass filter having a cut-off pulsation representing dynamics of response of the engine to a request for increased or reduced torque.

4. The method as claimed in claim 1, wherein the calculation for obtaining the low limit value comprises:
    subtracting a first static error from the torque value requested by the vehicle driver, to obtain a low intermediate signal; and
    applying to the low intermediate signal a delay corresponding to a maximum delay in the response of the engine to a request for increased torque expressed by the vehicle driver.

5. The method as claimed in claim 1, wherein the calculation for obtaining the high limit value comprises:
    adding a second static error to the torque value requested by the vehicle driver, to obtain a high intermediate signal; and
    applying to the high intermediate signal a delay corresponding to a maximum delay in the response of the engine to a request for reduced torque expressed by the vehicle driver.

6. The method as claimed in claim 2, wherein the recognition comprises:
    high-pass filtering the torque request; and
    a comparison, comprising:
        comparing the high-pass filtered torque request with a first positive threshold to recognize a start of a phase of increase of the torque request expressed by the vehicle driver; and
        comparing the high-pass filtered torque request with a second positive threshold to recognize an end of a phase of increase of the torque request, the second positive threshold being lower than the first positive threshold; or
        comparing the high-pass filtered torque request with a first negative threshold to recognize a start of a phase of reduction of the torque request expressed by the vehicle driver; and
        comparing the high-pass filtered torque request with a second negative threshold to recognize an end of a phase of reduction of the torque request, the second negative threshold being higher than the first negative threshold.

7. A system for monitoring the torque provided by a motor vehicle engine, or an electric engine, comprising:
    means for comparing an estimated or measured value of torque provided by the engine with a low or high limit value, to detect excessive braking or acceleration and/or insufficient braking or acceleration;
    means for calculating the low or high limit value, the calculation means comprising:
        a means for subtracting, or adding, a static error value from or to a torque value requested by the vehicle driver, to obtain a low or high intermediate signal; and
        a means for applying to the intermediate signal a delay corresponding to a delay in a response of the engine to a request for increased or reduced torque expressed by the vehicle driver.

8. The system as claimed in claim 7, further comprising means for recognizing an increase or a reduction in the torque request expressed by the vehicle driver, the comparison means comprising:
    means to compare the torque value with the low limit value if an increase in the torque request is recognized, to detect excessive braking and/or insufficient acceleration; and
    means to compare the torque value with the high limit value if a reduction in the torque request is recognized, to detect excessive acceleration and/or insufficient braking.

9. The system as claimed in claim 8, wherein the means for calculating the low or high limit value further comprises a means for low-pass filtering the delayed intermediate signal, having a cut-off pulsation representing dynamics of the response of the engine to a request for increased torque or for reduced torque expressed by the vehicle driver.

10. The system as claimed in claim 7, wherein:
    the calculation means for obtaining the low limit value comprises:
        a means for subtracting a first static error from the torque request, to obtain a low intermediate signal; and
        a means for applying to the low intermediate signal a delay corresponding to the maximum delay in the response of the engine to a request for increased torque;
    the calculation means for obtaining the high limit value comprises:

a means for adding a second acceptable static error to the torque request, to obtain a high intermediate signal; and a means for applying to the high intermediate signal a delay corresponding to the maximum delay in the response of the engine to a request for reduced torque.

* * * * *